UNITED STATES PATENT OFFICE.

E. G. HOLLAND, OF UNION SPRINGS, NEW YORK.

IMPROVED BEVERAGE.

Specification forming part of Letters Patent No. 55,106, dated May 29, 1866.

*To all whom it may concern:*

Be it known that I, ELIHU G. HOLLAND, of Union Springs, county of Cayuga, in the State of New York, have invented a method, heretofore unknown, of Manufacturing Wine, Vinegar, and Alcohol, or Brandy, the materials used for the manufacture of the aforesaid wine, vinegar, and brandy being the various acidifying properties contained in the berries or drupes of the *Rhus* or sumac tree or shrub, common in the United States and in Canada, belonging to the order *Anacardiaceæ*, in combination with common sugar or saccharine substances of any kind and water or other liquids, whereby fermentation may ensue and wine or vinegar may result, agreeably to the proportions of the several ingredients. In the production of alcohol or brandy, which has valuable medical qualities, the fermented juices of the aforesaid drupes or berries pass through the process of distillation.

I claim to have reduced the aforesaid invention to a practical form, having made excellent wine for common use, also possessing important medical qualities, by placing the sumac berries into water, thereby securing their entire properties by the process of stirring or smashing them; also by expressing the juice and adding it to the water; also by boiling the berries in water. By the addition of saccharine matter to the liquid, in which I have found that the strength of about two pounds of sugar and from that to three pounds to the gallon of the liquid are the best combinations, an excellent quality of wine is produced. One pound of the berries is sufficient (and sometimes less) for one gallon of water, the less strong juice requiring a less amount of saccharine matter to secure the desired fermentation.

I have also found in a few experiments that grapes, blackberries, tomatoes, raspberries, sweet cider, and fruits containing saccharine matter may be used in different combinations without damaging the quality of the wine, while at the same time they modify and deepen its color.

In the making of vinegar less saccharine matter is used, and a less quantity of the berries to the gallon of water is required. One pound of the berries is sufficient for five or six gallons of water. From five to ten quarts of molasses, or their equivalent in other forms of saccharine matter, are sufficient to make a barrel of vinegar.

What I claim as my invention, and desire to secure by Letters Patent, is—

The aforesaid discovery of making wine, vinegar, and brandy from the properties of the sumac drupes or berries.

ELIHU G. HOLLAND.

Witnesses:
CAMPBELL LEFLORE,
H. STONER.